(12) United States Patent
Letourneau et al.

(10) Patent No.: US 7,531,201 B2
(45) Date of Patent: May 12, 2009

(54) ORANGE JUICE PRODUCTS ATTAINED BY MANIPULATION OF SINKING SOLIDS

(75) Inventors: Stephen A. Letourneau, Holmes Beach, FL (US); Richard N. McArdle, Bradenton, FL (US)

(73) Assignee: Tropicana Products, Inc., Bradenton, FL (US)

( * ) Notice: Subject to any disclaimer, the term of this patent is extended or adjusted under 35 U.S.C. 154(b) by 556 days.

(21) Appl. No.: 10/330,911

(22) Filed: Dec. 27, 2002

(65) Prior Publication Data

US 2004/0126474 A1 Jul. 1, 2004

(51) Int. Cl.
*A23L 2/02* (2006.01)
(52) U.S. Cl. .................................. 426/599; 426/616
(58) Field of Classification Search .................. 426/599
See application file for complete search history.

(56) References Cited

U.S. PATENT DOCUMENTS

| | | | |
|---|---|---|---|
| 2,120,261 A | 6/1938 | Robison | |
| 2,724,652 A | 11/1955 | Brent et al. | |
| 3,764,710 A | 10/1973 | Inagami et al. | |
| 4,374,865 A | 2/1983 | Strobel | |
| 4,463,025 A | 7/1984 | Strobel | |
| 4,871,569 A | 10/1989 | Anderson et al. | |
| 4,889,739 A | 12/1989 | Powers et al. | |
| 4,938,985 A | 7/1990 | Swaine, Jr. et al. | |
| 4,946,702 A | 8/1990 | Stipp et al. | |
| 5,073,397 A | 12/1991 | Tarr et al. | |
| 5,108,774 A | 4/1992 | Mills et al. | |
| 5,162,128 A | 11/1992 | Mills et al. | |
| 5,225,221 A | 7/1993 | Camden et al. | |
| 5,232,726 A | 8/1993 | Clark et al. | |
| 5,260,086 A | 11/1993 | Downton et al. | |
| 5,993,887 A | 11/1999 | Harris | |
| 6,054,577 A * | 4/2000 | Sakai et al. | 536/123.1 |
| 6,143,347 A | 11/2000 | Keithly et al. | |
| 6,365,212 B1 | 4/2002 | McArdle et al. | |

OTHER PUBLICATIONS

Anon. 1983 United States Standards for Grades of Orange Juice, USDA, effective date Jan. 10, 1983. p. 1-15.*
Binkley, J. et al. Jun. 2002. Consolidated Markets, Brand Competition, and Orang Juice Prices, Current Issues in Economic of Food Markets, Agriculture Information Bulletin No. 747-06, p. 1-12, especially p. 6.*
Stanley, Doris, May 7, 1997. Cloudy is Good—When it Pretains to Citrus JicesNews. Agricultural Research Service. p. 1.*
Blair, et al., "Exploratory Experiments To Identify Chemicals Reactions Causing Flavor Deterioration During Storage of Canned Orange Juice. I. Incompatibility of Peel-oil Constituents With the Acid Juice", *Journal of Food Res.*, 17,235 (1952).
Scott, et al., "Composition Of Orange Juice Cloud", *Journal of Food Science*, 30, 833, (1965).
Peleg and Mannheim, "Production of Frozen Orange-Juice Concentration From Centrifugally Separated Serum and Pulp", *Journal of Food Science*, 35, 649 (1970).
Radford, et al., "Distrubution of Volatile Compounds Between the Pulp and Serum of Some Fruit Juices", *Journal of Agricultural Food Chem.*, vol. 22, No. 6, (1974).

* cited by examiner

*Primary Examiner*—Carolyn A Paden
(74) *Attorney, Agent, or Firm*—Banner & Witcoff, Ltd.

(57) ABSTRACT

Orange juice products and their method of production are varied in their naturally occurring combination of sinking solids and serum. Included is separating sinking solids from serum in order to prepare the orange juice products. Included are orange juice products which mimic not from concentrate (NFC) blends of freshly extracted and stored orange juices from different cultivars by adding separated sinking solids from one of the cultivars and reducing the amount of whole juice from that cultivar which is incorporated into the NFC blend.

35 Claims, 2 Drawing Sheets

ORANGE JUICE PRODUCTS ATTAINED BY MANIPULATION OF SINKING SOLIDS

BACKGROUND OF THE INVENTION

1. Field of the Invention

This invention relates to orange juice products which have improved flavor and/or aroma characteristics that are achieved by manipulating separated orange juice components, especially so-called sinking solids. More particularly, the invention is useful in the field of not from concentrate (NFC) orange juice. Orange juice insoluble solids, or sinking solids are manipulated whereby orange juice products are prepared that have at least one orange juice type that has an insoluble solids component other than its naturally occurring insoluble solids component.

2. Description of the Related Art

It is generally known to separate orange juice into fractions such as a serum phase and a solids or pulp phase. Known means for effecting such separation include centrifugation and filtration technologies. Often this separation is accomplished for one of two purposes. One usual purpose is for use in collecting pulp products. Another is in the context of preparing from-concentrate juices wherein the separated serum is concentrated and the previously separated pulp fraction is recombined with the thus concentrated juice.

U.S. Pat. No. 2,724,652 shows separating pulp from extracted juice by the use of a centrifuge. Concentration is practiced, the pulp is pasteurized, and the pulp is recombined with the concentrated juice. In this way, the pasteurized pulp is mixed with the concentrated liquid for purposes of preparing concentrated juices having a pulp which has not been subjected to the rigors of concentration. U.S. Pat. Nos. 4,374,865 and 4,463,025 show a citrus juice process within which juice is extracted, pulp is separated, and the pulp then is recombined with the concentrated juice stream. Juice blending is suggested for flavor optimization.

It is generally known that aroma and flavor components tend to be present in sinking solids or insoluble solids, often referred to as sinking pulp, while other compounds tend to be found more extensively in the liquid phase or serum portion of the juice. For example, early on it was suggested that orange oil existed as an adsorbed layer on the sinking pulp of orange juice. Blair et al., "Exploratory Experiments To Identify Chemical Reactions Causing Flavor Deterioration During Storage Of Canned Orange Juice, I. Incompatibility of Peel-Oil Constituence With the Acid Juice", *Journal of Food Research,* 17, 235 (1952). Others observed that oil was found primarily in the pulp of orange juice. Scott et al., "Composition Of Orange Juice Cloud", *Journal of Food Science,* 30, 833 (1965); and Peleg et al., "Production Of Frozen Orange Juice Concentrate From Centrifugally Separated Serum And Pulp", *Journal of Food Science,* 35, 649 (1970).

Radford et al., "Distribution Of Volatile Compounds Between The Pulp And Serum Of Some Fruit Juices", *Journal of Agricultural Food Chemistry, Volume* 22, Number 6 (1974) made several evaluations regarding volatile flavor compounds of orange juice. This article observed that 98% of the limonene in an orange juice sample was recovered from the pulp phase, while only 2% was recovered from the serum phase. Other hydrocarbons such as alpha-pinene, sabinene, mycrene, and valencene were found almost exclusively in the pulp phase, whereas esters, alcohols, and aldehydes were found almost exclusively in the serum phase.

While the art generally has noted differences in the make-up of pulp or solids phases of orange juices on the one hand and the make-up of liquid or serum phases of orange juices on the other hand, recognition of these overall differences has not led to significant direct improvement of actual orange juice products.

One challenge facing the NFC orange juice industry is the problem of maintaining consist orange juice products throughout the year. The fruit setting, growing, maturing and harvesting of round oranges does not occur throughout the year, even in areas of the world having very favorable citrus growing conditions. For example, in the Northern Hemisphere, no significant industrial-scale harvesting of oranges for juice production occurs between about mid-June and about mid-September. Furthermore, currently a large volume of juice oranges which are available in important orange grove areas such as the State of Florida have taste, aroma, color and/or sensory properties which are less desirable or inferior to juice oranges available later in the season. More particularly, these later season juice oranges which have superior taste, aroma, color and sensory properties are within the Valencia family of orange cultivars, which for many years has been considered the prime juice orange type or cultivar.

The result is a non-uniform supply of juice oranges during the harvesting season and a lack of juice oranges outside of the harvesting season. This makes it impossible to use freshly extracted orange juice throughout the year and that is uniform in taste, aroma, color and sensory properties. Because of this, whole juice storage of orange juice has been practiced for many years in the NFC orange juice industry. Typically, whole Valencia juice is extracted, pasteurized and stored, usually under frozen conditions. The stored Valencia juice then is used during the time when no orange harvest is available, as well as when the dominant orange harvest provides freshly extracted pasteurized juices which are inferior to Valencia juices. In the latter situation, typically the stored Valencia pasteurized whole juice is blended with freshly extracted juice from the more inferior sources in order to provide NFC juice during this time of the season.

With more particular reference to the more inferior sources of orange juice, currently the principle juice orange which is available in the early-to-mid-season is the Hamlin juice orange. Other juice oranges which have more limited availability and a much lower degree of acceptability than Hamlin juices include other so-called early/mid-juice oranges, namely Pineapple and Parson Brown. References herein to early/mid-season oranges refer to juice oranges of this type. Similarly, references herein to late season oranges refer primarily to orange cultivars within the Valencia family.

An NFC juice product has to be a whole juice product which meets certain standards, one of which is that there be no concentrating or reconstituting during juice product production. Traditionally, this requirement has been achieved by maintaining purely whole juices, either as freshly extracted or in their stored form. It will be appreciated that storing of whole pasteurized NFC juices is very costly, both in terms of capital investment and operating costs. Often such storage facilities require storage tanks of extremely large volume on the order of hundreds of thousands of gallons. They also require operating costs to maintain the chilled condition, which is made more costly and difficult because most storage facilities are close to the orange fruit sources and production facilities, which are almost always within areas having high temperatures and humidity during the off-season or storage months. Also, such a large volume of storage requirements entails substantial labor costs.

Another cost matter of concern to NFC juice production is the greater expense associated with Valencia juices. Largely because Valencia is generally considered to be superior in overall quality (including color and oil) the citrus processing industry pays a premium, on a per pounds of solids basis, for Valencia fruit. Purchasing on a pounds solids basis is done based upon the amount of juice in a 90-pound box of fruit, multiplied by the Brix of the juice. As known, Brix generally equates to the soluble solids or dissolved solids in the fruit juice. As a result, Valencia juice is more costly for the citrus processor than is Hamlin juice per gallon, at an equal Brix strength. Thus, the lower the amount of Valencia juice needed to maintain a substantially consistent NFC juice throughout the year, the lower the cost to the citrus processor and producer of NFC pasteurized juice.

There is accordingly a need for approaches which will allow NFC juice producers to maintain a substantially consistent product throughout the calendar year while also having the opportunity to reduce cost by decreasing the relative amount of Valencia juice which needs to be stored during its off season. Further advantages could be realized if the early/mid orange juices currently available on a large industrial scale could be used more widely, either in or out of their season, than currently in use.

Needs such as these are successfully addressed by the present invention. An important element in achieving the objectives of the present invention is an appreciation that whole juice separation and recombination procedures of certain types bring about a result whereby inferior resources and superior resources are removed, combined or exchanged so as to maintain or enhance important juice qualities throughout the calendar year, while simultaneously reducing relative costs.

SUMMARY OF THE INVENTION

In accordance with the present invention, whole, freshly extracted orange juice is separated into a serum phase and a sinking solids phase. These phases can be stored, either one or both of them depending upon the particular embodiment. Again depending upon the particular embodiment, the stored serum phase or sinking solids phase is added to a whole juice, or to a serum or sinking solids phase of the whole juice. The combinations of serum and sinking solids thus assembled adjust the naturally occurring combination of serum phase and soluble solids phase, in many instances by combining a phase or phases from a late season juice with a phase or phases from an early/mid season juice.

A general object of the present invention is to provide an improved orange juice and method of its production which shifts separated juice solids and/or separated juice serum from its naturally occurring combination to one which imparts quality or cost benefits.

Another object of the present invention is to provide an improved product and method of producing same which separates orange juice into solids and liquid phases and then carries out phase switching in order to prepare unique not from concentrate orange juice products.

Another object of this invention is an improved method and product whereby inferior orange juice resources are removed and/or combined with superior orange juice resources.

Another object of the present invention is to provide an improved method and product which involves blending separated solids, separated serums and/or juices originating from juices harvested at different times of the year, at least one of which had been stored.

Another object of the present invention is to provide a blend of juice components from different season cultivars which mimics a blend of whole juices, but with a reduced cost.

Another object of this invention is an improved method and product by which quantities of stored whole juice needed for preparing a given quantity of juice blends including stored juice are substantially reduced.

Another object of the invention is an improved method and product which allows for the use of stored separate phase components from inferior juice resources to be used at a different time during the juice orange harvesting season.

Other objects and advantages of the present invention will be understood from the following description according to preferred embodiments of the present invention, relevant information concerning which is shown in the accompanying drawings.

DESCRIPTION OF THE PREFERRED EMBODIMENTS

Starting materials for the invention are whole orange juices. The orange juices are extracted from orange fruit in commercial-scale, industrial-quality extractors which are well-known in the juice processing art. Included in possible starting materials are those from orange cultivars harvested in the late season. Typically these are within the Valencia family. They tend to begin maturing in late February and continue to be harvested until early June within a typical late season in the Northern Hemisphere. These later season juices have been found to provide superior resources as a solids phase and as a serum phase.

Other starting materials are the so-called early/mid-season juice orange sources. These consist primarily of Hamlin orange cultivars but can include other cultivars such as Pineapple and Parson Brown cultivars. Typically, Hamlin cultivars have a harvesting season from about late October to December, whereas Pineapple oranges have a later or "mid" season, with its harvesting taking place typically between about January and early March. These early/mid cultivars have pasteurized NFC juices which provide inferior resources to the compositions to the invention.

It will be appreciated that the harvesting seasons can vary from year to year, depending largely on weather and other growing conditions. Depending on the embodiment of the invention, the NFC juice extracted as NFC juice is separated so as to provide a serum phase and a sinking solids phase.

Orange juice contains a cloud suspension that contributes to the color, flavor, aroma and turbidity of the juice. This cloud is comprised of membranes, oil droplets, flavonoid crystals, chromatophores, and cell wall fragments of protein, pectin, cellulose and hemicellulose. The components of juice cloud have varying particulate sizes that range from approximately 2 to 1000 microns. Particulates of larger size tend to settle in the juice over time. This material is commonly referred to as sinking pulp. Smaller, colloidal particulates remain suspended in the juice and make up what is known as stable cloud.

The citrus industry commonly describes two types of pulp in processing operations, namely sinking pulp and floating pulp, to characterize the quantity of suspended insoluble material in juice. The citrus industry uses a centrifugation method to measure sinking pulp as a volume of fraction of the juice. Typical sinking pulp values in orange juice range from about 5 to about 15 volume percent, typically between about 8 and about 12 volume percent, based upon the total weight of the orange juice. In many juices, the natural sinking solids content is about 12 volume percent, based on the total volume of the juice. Sinking pulp can be referred to by different terms, such as sinking solids. Other terms used in this regard include insoluble solids, bottom pulp and background pulp. Generally speaking, such sinking solids or sinking pulp are made up of insoluble materials and are generally not sensed on the tongue as discrete particles. Generally, the particle sizes of sinking solids are not greater than about 0.5 mm.

Also present in some orange juices is what is known in the industry as floating pulp, which is the pulp that imparts mouthfeel to orange juice. Floating pulp does not settle in orange juice and is commonly added to commercial orange juice products to provide a "fresh-squeezed" appeal. Such floating pulp typically is distinguished from the sinking pulp or sinking solids phase or component discussed herein.

In a typical orange juice extraction process, the orange fruit is mechanically squeezed or reamed to yield a highly pulpy juice. Rag and seeds are removed. This mixture of pulp and juice often is clarified by a so-called finisher, which separates the pulp from the juice by means of a sieve mechanism. This pulp stream then is recovered for floating pulp usage. The juice stream coming out of the finisher apparatus contains the sinking pulp or sinking solids, which are too small to be captured by the finisher sieve. This is a typical freshly extracted whole juice source. Pasteurization will normally be carried out within a few hours of extraction and preferably no later than about a day thereafter.

In accordance with the present invention, this juice stream is separated into sinking pulp or a sinking solids phase and a serum phase, which is the phase remaining after separation of the sinking solids. The phases typically then are separately pasteurized. Each is stored under generally chilled conditions, such as at less than 5° C. (for example about 35 F.) until needed for use in making up combinations according to the invention.

The preferred manner of separation embodies centrifugation action. It is generally known that sinking pulp can be adjusted out of the juice stream by centrifugation in order to help control juice viscosity when a juice stream has a sinking pulp level in excess of about 15% by volume, based upon the total volume of the juice stream. In accordance with the present invention, virtually all of the sinking pulp is separated from the juice stream, thereby forming the sinking solids phase and the serum phase. Generally speaking, the serum phase is what remains after rag, seed and pulp are separated. It typically comprises water and compounds giving flavor and aroma to the orange juice.

Prior to separation according to the invention, the orange juice stream contains a complex mixture of volatile aroma compounds that vary as a result of numerous factors. These factors include the particular cultivar from which the juice originated, the maturity level of the harvested fruit, fruit processing conditions, and fruit and juice handling and storage conditions. Major classes of compounds which are involved in orange juice flavor and aroma characteristics are alcohols, aldehydes, esters and hydrocarbons. These compounds exist in the peel and/or the juice of the whole orange fruit. Compounds from the peel, which often are referred to as peel oil, typically are the hydrocarbons and aldehydes which are not water-soluble. For example, limonene is the major constituent of orange peel oil, typically accounting for greater than 90% of its volume.

Compounds originating from the juice of the raw fruit fall into two general categories. One is so-called essence oil, which contains mainly limonene. The other major type is essence aroma, and this contains water-soluble compounds.

The art generally has recognized that there is a relationship between sinking pulp and aroma and flavor compounds. Hydrocarbons such as limonene, alpha-pinene, sabinene, mycrene and valencene are found almost exclusively in the pulp. The juice serum typically holds almost all of the esters, alcohols and aldehydes. Laboratory work associated with this invention has shown that the various classes of the volatile aroma compounds of orange juice are specifically associated with the serum phase or with the pulp phase of the orange juice. According to these findings, alcohols and esters were determined to be found primarily in the serum phase, while aldehydes, ketones and hydrocarbons were determined to be associated with the sinking solids or sinking pulp phase.

It has come to be appreciated that, although these general classes of compounds tend to be present in one or the other of the sinking solids phase or the serum phase which are each separated from the juice stream according to the invention, the make-up and quality of specific compounds within these broad classes greatly influences the desirability of either phase. For example, it has come to be appreciated that both the sinking solids phase and the serum phase of Valencia juice sources provide a superior source of aroma, color and flavor or sensory properties. In this context, the term superior indicates better than like properties of like serum or sinking solids phases separated from juice streams of early/mid-season cultivars. The term inferior resources is used at times herein to refer to early/mid-season cultivar sources.

After separation, storing is carried out according to the invention. The storing can be under aseptic conditions and typically will be at a temperature at which the serum phase or sinking solids phase is in a semi-frozen or chilled state of about 35 F. The sinking solids phase and the serum phase are stored in separate aseptic storage tanks at a temperature less than about 5° C. in a usual operation. These separately stored phases are capable of long-term storage of several months and longer. This separate storage is believed to have the benefit of reducing negative flavor interactions between the sinking solids and the serum during the long-term storage.

Additionally, typically before storage, and if needed after storage as well, the separate sinking solids phase and serum phase are pasteurized separately. This likewise is believed to minimize negative flavor reactions between respective components of the serum phase and of the sinking solids phase. In those circumstances where further processing may be practiced, such as homogenization, such also will be carried out separately, thereby also minimizing negative flavor reactions or interactions among components from the serum phase with components from the solids phase.

In a case of a Valencia juice stream, storage would occur during at least the time where there is no Valencia juice production, from about mid-June through to about March. Valencia storage times can be longer, such as when the Valencia phase being stored was put up earlier in the Valencia season than June.

Storing of an early/mid-season juice phase has similar storage patterns except the storage begins in about September through December for the early season cultivars and between about December and March for the mid season cultivars. By generating a solids phase from the early/mid juice stream, the stored solids phase can be used during the Valencia season in order add volume to superior Valencia whole juice that can accommodate a more inferior resource without detrimentally affecting the NFC product resulting from such a blend.

While storing of serum phase separated from an early/mid-season cultivar juice stream could be cost efficient, because of the more generally inferior nature of an early/mid-season serum phase when compared with Valencia serum, care has to be taken to avoid adding too great a quantity early/mid season stored serum.

Referring more particularly to the procedure of blending one or more stored phases, various options are contemplated. Generally speaking, addition of a superior phase into a freshly extracted NFC juice in the inferior category substantially improves the theretofore inferior whole juice. The overall approach is to have subjected the inferior whole juice to separation so as to remove some or all of the phase, such as sinking pulp, to be added from the stored source. Another strategy does not require the actual addition of a stored phase to an inferior whole juice. Instead, a portion of the inferior phase, typically part of the solids phase of the inferior whole juice is removed, which reduces its inferiority characteristics to bring it at or closer to a more superior level. Whether the removal strategy or the exchange strategy is used, the phase which is removed can be the stored phase from that particular season.

An important example of the approach by which an inferior freshly extracted whole juice is enhanced with a stored phase occurs during the early/mid-season harvesting. Stored Valencia solids are blended into a source of freshly extracted early/mid-season juice stream, such as a Hamlin juice stream. It is customary in the early/mid season to blend whole juice sources in order to improve the early/mid freshly extracted NFC juice. This entails blending with the freshly extracted Hamlin juice a source of stored whole Valencia juice. For example, a whole juice blend can comprise about 40% Valencia juice and about 60% Hamlin juice. By proceeding in accordance with the present invention, a juice product substantially equivalent to the 40/60 product is prepared with lower levels of the stored Valencia juice. For example, a blend containing about 70% Hamlin juice, about 30% stored whole Valencia juice, and a relatively low level of stored Valencia solids provide a juice blend substantially equivalent to the 60/40 whole juice blend.

It will be appreciated that, with an approach such as this example, there is a reduced need to store whole Valencia juice in order to prepare the same total volume of blended juice during a given time frame. Concerning the option of improving NFC citrus juice blends by exchanging components, generally speaking all or part of an inferior phase is removed and replaced with a superior source stored phase. For example, freshly extracted Hamlin whole juice can be subjected to separation so as to remove a quantity of Hamlin sinking solids phase. To this modified juice stream, stored Valencia sinking solids phase is added. The resulting blend of serum and solids contains an increased amount of superior solids and a reduced amount of inferior solids. Testing has shown that this approach enhances sensory flavor profiles while reducing the total amount of superior juice phase components needed for preparing a superior juice blend.

Another exchange option does not necessarily improve the blended juice product. Rather, it conserves superior phase resources by replacing them with inferior sources. For example, during the late season, some of the superior Valencia sinking solids phase can be removed from the freshly extracting whole juice and stored for future use. This can be replaced with stored early/mid-season sinking solids. This is because the substantial superiority of the Valencia source including its serum and remaining Valencia sinking solids are so superior that a quantity of inferior Hamlin sinking solids can be tolerated.

With reference to the removal strategy, improvement in inferior whole juice may come about by removing some of the inferior sinking solids therefrom. Thus, early/mid-season freshly extracted juice streams are improved by removing sinking solids therefrom.

Additionally, the removal strategy has the potential benefit of removing superior sinking solids from a freshly extracted superior NFC juice stream. The separated superior sinking solids phase, such as Valencia sinking solids, can be stored for future use, typically during the early/mid season. Because of the superior qualities of the remainder of the superior Valencia juice stream from which the sinking solids had been removed, the aroma, color and sensory properties of the remainder juice remain satisfactory as a superior juice. This approach is especially beneficial in circumstances such as when the freshly squeezed Valencia source has an over abundance of superior Valencia sinking solids so that the excess can be safely removed and stored for future use.

Another application of the removal strategy applies very late in the Valencia season, when the harvested fruit is overly ripe and there is an excess of negative hydrocarbons, such as limonene, in the pulp of the fruit. Removing some of the Valencia sinking solids removes a negative component such as limonene, thereby improving the late-season extracted Valencia juice and adjusting it to more closely emulate the superior standing associated with prime season harvested Valencia juice.

Products of this invention are NFC orange juices which have undergone phase manipulation. Often sinking solids from one type of cultivar juice are added to a whole juice from a different cultivar type. For example, up to about 25 volume percent of sinking solids, usually at least about 2 volume percent, are added to between about 98 and about 75 volume percent of whole juice or serum phase.

In other products sinking solids are removed from whole juice, typically from about 2 to about 100 volume percent sinking solids being removed. About 75 to about 98 volume percent of this solids-reduced juice is blended with about 2 to about 25 volume percent of sinking solids, preferably from a different cultivar, based on the total volume of the juice. Other products can be blends of from about 10 to about 90 volume percent of one whole juice and from about 90 to about 10 volume percent of a serum phase from another juice, based on the total volume of the juice.

Exemplary illustrations of the disclosure herein are provided in the following Examples. These include testing illustrating various options for embodying the principles discussed herein.

EXAMPLE 1

Samples were prepared to mimic a typical whole juice blend which provides very good NFC orange juice during the mid/early season. This NFC orange juice, which was the control juice for sensory testing, was comprised of 40% stored whole Valencia juice and 60% freshly extracted and pasteurized Hamlin juice. The resulting NFC 40/60 control was packaged in a quart-sized glass container.

A mimic orange juice was prepared as follows. Only 30% of the stored Valencia juice was blended with 70% freshly extracted Hamlin juice from which 60% of the Hamlin sinking solids phase was removed. This mimic orange juice NFC product thus embodies the removal strategy. This likewise was packaged in a quart-sized glass container.

A second test juice was prepared. This was comprised of freshly extracted Hamlin juice having 60% volume of the Hamlin sinking solids removed, which was blended with 5% volume stored Valencia solids. This was packaged in a quart-sized glass container. This represents an exchange strategy.

All three samples were subjected to a sensory discrimination analysis. Testing was conducted as a duo-trio balanced reference discrimination test. Of 60 panelists, 33 (55%) provided the response that all three samples were similar in sensory analysis. Statistical analysis of this result, conducted at the 90% confidence level, indicated that only 26% of the population represented by these panelists may be able to discern a difference among these products. The overall conclusion of the testing is that each of the three products is similar to the other.

EXAMPLE 2

A supply of freshly extracted NFC Valencia orange juice and stored supplies of NFC Hamlin orange juice were used to prepare samples. Both sources were subjected to centrifugation, and separate serum phases and soluble solids phases were prepared.

One sample was a blend of all Hamlin serum and all Valencia solids. Another sample was a blend of all Valencia serum and all Hamlin solids. Further sample was all Hamlin serum, half Hamlin solids, and half Valencia solids. Another sample was all Valencia serum, with half Valencia solids and half Hamlin solids. These were analyzed for juice chemistry and were subjected to sensory evaluation, along with a sample of all Hamlin unseparated NFC juice, a sample of all Valencia unseparated juice, and a sample of half Hamlin unseparated juice and half Valencia unseparated NFC juice. Juice chemistry information is provided in Table I.

TABLE I

|  | Brix | Ratio | Scott Oil | Sinking Pulp | Color Index | Viscosity |
|---|---|---|---|---|---|---|
| Hamlin Juice Control | 10.9 | 18.5 | .006% | 12% | 33.6 | 6.0 Cps |
| Valencia Juice Control | 12.5 | 20.2 | .038% | 14% | 37.7 | 5.4 Cps |
| 50% Hamlin Juice/ 50% Valencia Juice Control | 11.8 | 19.3 | .022% | 15% | 36.1 | 5.8 Cps |
| Hamlin Serum + Valencia Solids | 10.9 | 18.8 | .018% | 13% | 37.2 | 5.5 Cps |
| Valencia Serum + Hamlin Solids | 12.3 | 19.9 | .020% | 15% | 35.2 | 6.3 Cps |
| Hamlin serum + 50/50 Solids | 11.1 | 18.8 | .014% | 14% | 35.8 | 6.4 Cps |
| Valencia serum + 50/50 Solids | 12.4 | 20.0 | .026% | 14% | 36.5 | 5.7 Cps |

In Table I, the ratio is the Brix-to-acid ratio (or BAR). It will be understood that the acid value, as citric acid, can be determined by dividing the Brix value by the ratio. The bottom pulp percentage was determined by noting the volume of bottom pulp in the total juice volume. The viscosity (in Centipoise) was determined by using a Brookfield Rotational Viscometer, Model LVDVII+, with UL adaptor, operated at 60 rpm, at 20 C.

Sensory evaluations were conducted using an orange juice descriptive sensory analysis profile, where various attributes were scored using a 15-point anchored universal line scale. The resulting scores were compared among the samples. For some of the sensory attributes, there were no significant differences in the scores from sample to sample. Those instances where differences were noted are reported in this and other Examples herein, which include the following sensory attributes.

A basic taste for food solutes, perceived by receptors in the mouth, is the "sweet" attribute, represented by sucrose. A "viscosity" sensory attribute is a scaled rating by the trained sensory panelists of the thickness and mouthfeel of the juice based on training as between very thin, low viscosity juice versus a very thick/high viscosity juice. The remaining attributes concern aromatics, namely food volatiles perceived by receptors in the olfactories.

The "total orange" aromatic attribute recognizes fruity aromatics associated specifically with orange juice or orange flavoring and is roughly a total of the next four attributes. The "raw orange" attribute, which is a positive sensory attribute portion of the "total orange" attribute, is typical of unprocessed, freshly squeezed orange juice, free of addbacks, such being represented by the pulpy portion of the orange. "Cooked orange", which is a negative sensory attribute, is that portion of the total orange attribute that is typical of processed or heated orange juice, such being represented by shelf-stable orange juice products. The "expressed orange oil" attribute, which is a positive sensory attribute, is that portion of the total orange attribute which is typical of unprocessed orange oil, and is represented by fresh flavedo (the pigmented part of the orange peel) or unfolded orange essence oil. The "candy/ artificial orange" attribute, which is a generally negative attribute, is that portion of the total orange attribute which is typical of processed orange peels and flavors, and is represented by orange candies and orange soda.

The "other fruit" attribute, which is a generally negative attribute, is represented by fruity aromatics associated with tropical fruits, stone fruits, and/or or berries. The "cooked vegetable" attribute, which is generally negative, is represented by aromatics associated with overprocessed vegetables, such as canned green beans and asparagus. The "microbiological" attribute, which is generally negative, is represented by off-flavors of the type caused by microbial activity, including yeast, mold, diacetyl and lactic acid activity.

A sensory analysis was run concerning the effects of serum and the effects of bottom solids averaged across all of the sample products. These are reported in Table II, from which it is noted that replacing Hamlin serum or Hamlin solids with Valencia serum or Valencia solids resulted in a higher expressed orange oil flavor and lower other fruit flavors. The following also is noted. Changing the serum type from Hamlin to Valencia also resulted in increased total orange impact, raw orange flavor, sweetness and the viscosity sensory attribute, as well as decreased cooked vegetable and microbiological notes. In Table II, the scores with the same letter (or no letter) within the same section and row are not significantly different from each other at the 90% confidence level.

TABLE II

|  | Serum Type | | | Bottom Solids Type | | |
| --- | --- | --- | --- | --- | --- | --- |
|  | Hamlin | 50/50 | Valencia | Hamlin | 50/50 | Valencia |
| Total Orange | 4.0b | 4.8a | 4.8a | 4.2 | 4.6 | 4.5 |
| Raw Orange | 1.0b | 1.4a | 1.4a | 1.2 | 1.3 | 1.2 |
| Expressed Orange Oil | 1.4b | 1.8a | 1.7a | 1.3b | 1.7a | 1.6a |
| Other Fruit | 0.6a | 0.3b | 0.3b | 0.6a | 0.3b | 0.3b |
| Cooked Vegetable | 0.1a | 0.1ab | 0.0b | 0.1 | 0.0 | 0.0 |
| Microbiological | 0.1a | 0.0b | 0.0b | 0.1 | 0.0 | 0.0 |
| Sweet | 5.2b | 5.4a | 5.4a | 5.4 | 5.3 | 5.3 |
| Viscosity | 1.52b | 1.53ab | 1.54a | 1.52 | 1.53 | 1.54 |

Figure 1:
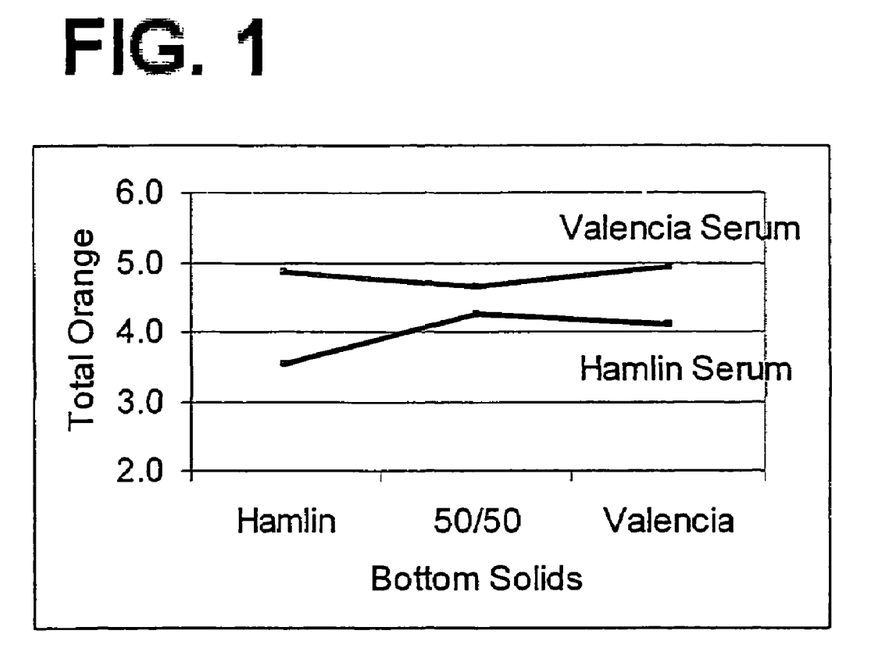
FIG. 1 is a plot of data illustrating the effect on the total orange sensory quality of adding different sinking solids to different juice serums.
Figure 2:
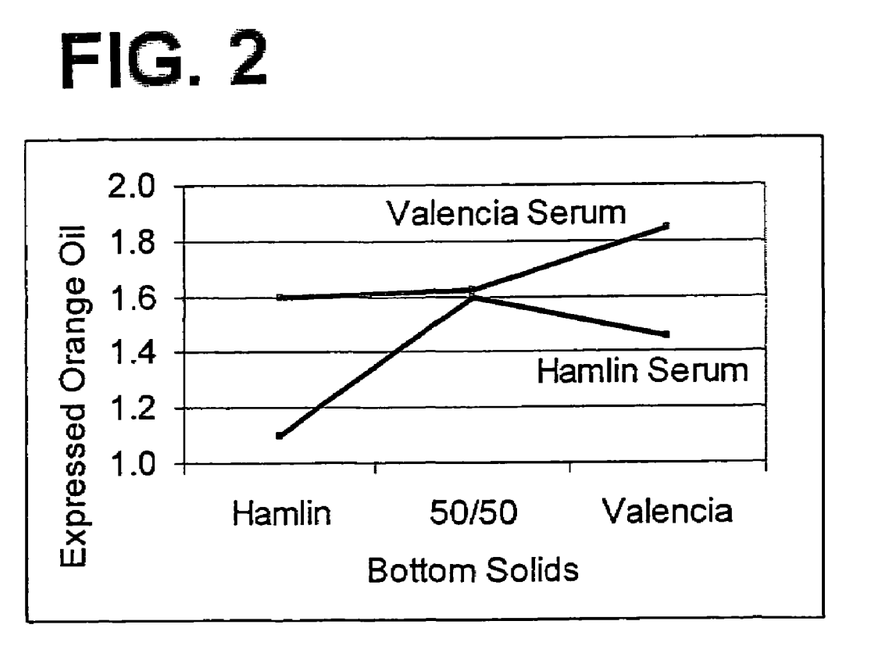
FIG. 2 is a plot of data illustrating the effect on the expressed orange oil sensory quality of adding different sinking solids to different juice serums.
Figure 3:
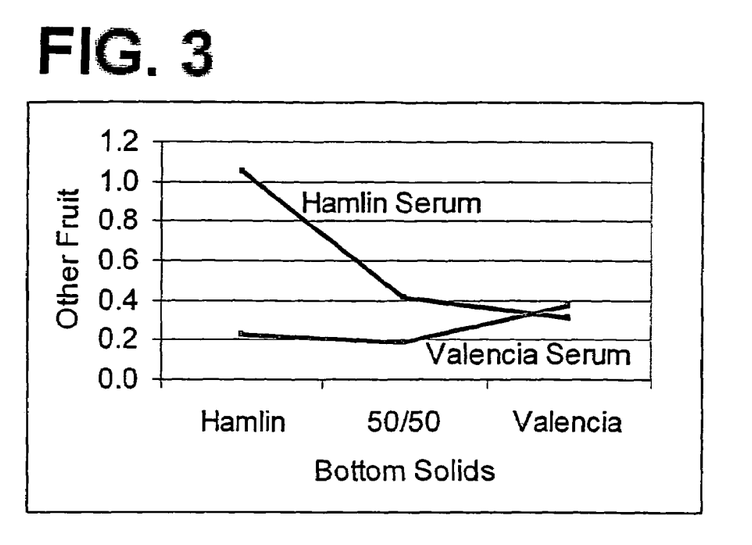
FIG. 3 is a plot of data illustrating the effect on the other fruit sensory quality of adding different sinking solids to different juice serums.

Evaluating these data for the effects of bottom solids on different serum streams shows the following. Substituting Valencia bottom solids for Hamlin bottom solids has a larger positive sensory effect in Hamlin serum than in Valencia serum. This effect is most apparent when substituting half of the bottom solids, while further substitution had little effect. This is illustrated in each of FIG. 1, FIG. 2 and FIG. 3, wherein it is seen that the positive effect of adding half Valencia solids to Hamlin serum gives a positive slope (negative slope in the case of "other fruit"), while replacing all of the Hamlin bottom solids with Valencia solids gives no statistically significant change from the 50% substitution of Valencia solids for Hamlin solids in the Hamlin serum. It will be appreciated that the total orange attribute of FIG. 1 and the expressed orange oil attribute of FIG. 2 are positive attributes, and a higher score indicates an improvement. The other fruit attribute of FIG. 3 is a negative attribute, and a lower number indicates more positive results.

Thus, a 50% substitution of Hamlin solids with Valencia solids within Hamlin serum results in a significant reduction in the other fruit score. The total replacement of Hamlin solids with Valencia solids within Hamlin serum had little additional effect on the other fruit attribute. These data also illustrate relatively good results for total orange, expressed orange oil and other fruit sensory analysis when Valencia serum is used, while the make up of the bottom solids had only a generally minimal effect.

EXAMPLE 3

Further analysis was conducted using the samples of Example 2. Comparing the 100% Hamlin juice control of Example 2 to each of the non-control sample products indicated that each of the serum and solids blends were higher in the positive sensory attributes of total orange impact and expressed orange oil flavor, and they were each lower than the Hamlin juice control in the negative sensory attribute of other fruit. There was a statistically significant difference in viscosity between the Hamlin control and Hamlin serum products when compared with the Valencia serum having half Valencia solids and half Hamlin solids.

These data are reported in Table ITT, wherein the sensory scores marked with an asterisk are significantly different from the 100% Hamlin juice control at the 90% confidence level.

TABLE III

|  | Hamlin | Hamlin Serum | | Valencia Serum | |
| --- | --- | --- | --- | --- | --- |
|  | Juice Control | Valencia Solids | 50/50 Solids | Hamlin Solids | 50/50 Solids |
| Total Orange | 3.5 | 4.1* | 4.3* | 4.8* | 4.7* |
| Raw Orange | 0.9 | 1.0 | 1.2 | 1.5* | 1.5* |
| Expressed Orange Oil | 1.1 | 1.5* | 1.6* | 1.6* | 1.6* |
| Other Fruit | 1.1 | 0.3* | 0.4* | 0.2* | 0.2* |
| Viscosity | 1.52 | 1.51 | 1.52 | 1.53 | 1.54* |

EXAMPLE 4

A similar analysis was done using the samples of Example 2. This time, the 100% Valencia juice control was compared to the blends of serum and solids sample products. See Table IV for sensory results.

TABLE IV

|  | Valencia | Hamlin Serum | | Valencia Serum | |
| --- | --- | --- | --- | --- | --- |
|  | Juice Control | Valencia Solids | 50/50 Solids | Hamlin Solids | 50/50 Solids |
| Total Orange | 4.9 | 4.1* | 4.3* | 4.8 | 4.7 |
| Raw Orange | 1.4 | 1.0* | 1.2 | 1.5 | 1.5 |
| Expressed Orange Oil | 1.8 | 1.5* | 1.6 | 1.6 | 1.6 |
| Sweet | 5.5 | 5.1* | 5.2* | 5.4 | 5.4 |
| Viscosity | 1.56 | 1.51* | 1.52* | 1.53* | 1.54 |

The substitution of Hamlin solids into Valencia serum at either 50% replacement or entire replacement had no effect on the sensory attributes when compared to those of the 100% Valencia juice control. It is noted that the Valencia serum combined with 100% Hamlin solids was noticeably less viscous than the Valencia control. Table TV also indicates, when compared to the 100% Valencia juice control, products made with Hamlin serum with either half or complete Valencia solids replacement were lower in the positive attributes of total orange impact and sweetness, and had a lower viscosity compared to the Valencia control. In this case, lower means significantly different at the 90% confidence level, as indicated by an asterisk in Table IV. Additionally, the blends of Hamlin serum with full Valencia solids and no Hamlin solids were statistically lower in the positive attributes of raw orange flavor and expressed orange flavor.

EXAMPLE 5

Each test product of Example 2 was compared with the blended control juice of half Hamlin and half Valencia juice, which is intended to roughly approximate blended juices for commercial NFC products in the Hamlin or early/mid season. These sensory data are reported in Table V.

TABLE V

|  | 50% Hamlin | Hamlin Serum | | Valencia Serum | |
| --- | --- | --- | --- | --- | --- |
|  | 50% Valencia Control | Valencia Solids | 50/50 Solids | Hamlin Solids | 50/50 Solids |
| Total Orange | 4.8 | 4.1* | 4.3* | 4.8 | 4.7 |
| Raw Orange | 1.4 | 1.0* | 1.2 | 1.5 | 1.5 |
| Cooked Orange | 1.1 | 0.8* | 1.1 | 0.9 | 0.9 |
| Expressed Orange Oil | 1.8 | 1.5* | 1.6 | 1.6 | 1.6 |
| Candy/Artificial Orange | 0.4 | 0.8* | 0.5 | 0.8* | 0.6 |
| Sweet | 5.4 | 5.1* | 5.2 | 5.4 | 5.4 |

Table V indicates that the Valencia serum with half Hamlin solids and half Valencia solids is very similar in its sensory profile to the 50/50 control juice. When all of the Valencia solids were replaced with Hamlin solids none of the sensory results were similar to the 50/50 control product, with the exception of a higher score for the negative attribute of candy/artificial orange flavor. The Hamlin serum with half Valencia solids and half Hamlin solids had a more similar sensory profile to the 50/50 control than did the Hamlin serum with 100% Valencia solids. In each case, there were no statistically significant differences between any of the test products and the 50/50 control with respect to other sensory attributes including other fruit, cooked vegetable and microbiological, and the respective viscosities were not significantly different.

EXAMPLE 6

A principal components analysis was run which reduces the total of 18 sensory attributes to two summary variables which represent 52% of the variance in the data set. This analysis of variants in principal components was run across all test and control products. The first summary variable, which is the principal component indicating more orange impact, and the second summary variable, which is the principle component indicating more off flavors, are reported in Table VI.

TABLE VI

|  | Hamlin | 50% Hamlin | Valencia | Hamlin Serum | | Valencia Serum | |
| --- | --- | --- | --- | --- | --- | --- | --- |
| Summary Variable | Juice Control | 50% Valencia Control | Juice Control | 50/50 Solids | Valencia Solids | 50/50 Solids | Hamlin Solids |
| First | $4.2^c$ | $5.7^a$ | $5.8^a$ | $5.1^{ab}$ | $4.8^{bc}$ | $5.6^a$ | $5.7^a$ |
| Second | $1.4^a$ | $1.1^{ab}$ | $1.0^b$ | $1.3^{ab}$ | $1.3^{ab}$ | $1.1^{ab}$ | $1.0^b$ |

Figure 4:
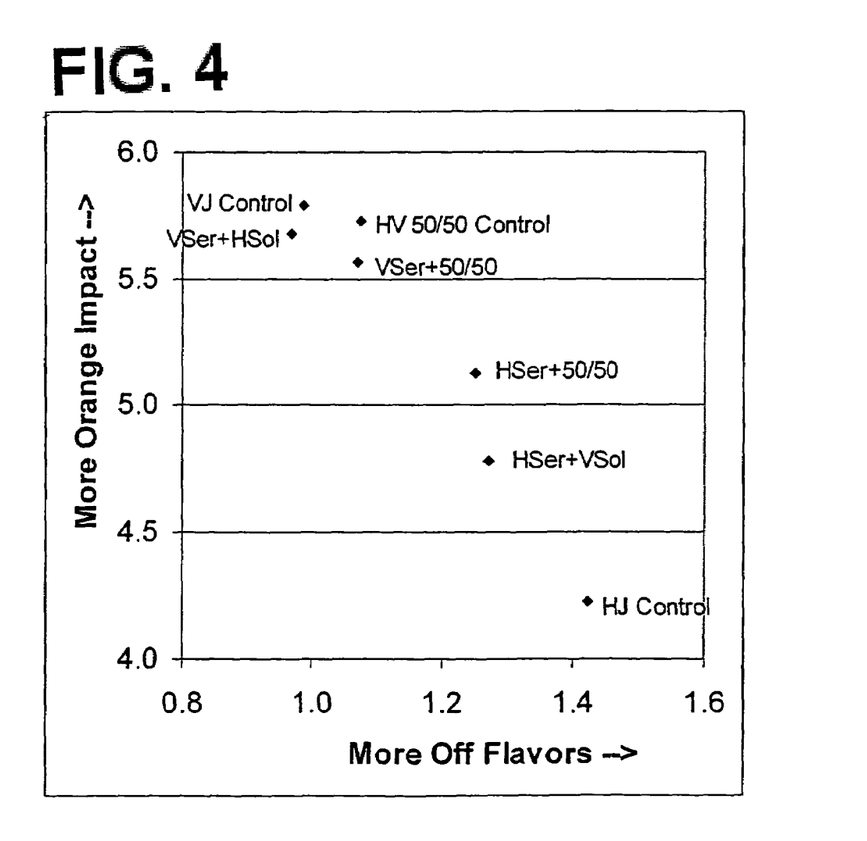
FIG. 4 plots a principal components analysis of multiple sensory qualities showing spatial relationships among control juices and blends of solids, serums and/or juices.

FIG. 4 plots the data of Table VI, namely a plot of the first summary variable (More Orange Impact) against the second summary variable (More Off Flavors). This illustrates the "spatial" relationships between the test and control products. It will be noted that the 100% Valencia juice control lies at one extreme of the continuum, while the 100% Hamlin juice control lies at the other extreme. The third juice control of 50% Hamlin and 50% Valencia blended juices are closely associated with the 100% Valencia juice control, as are the two test products which are Valencia serum products, one with entirely Hamlin solids, and the other with half Hamlin and half Valencia solids. The two test products of Hamlin serum lie in between the Valencia juice control and the Hamlin juice control.

Table VII provides a sensory data set for each of the controls and test products. This reports on those sensory variables which are reported upon in Examples 2-6. Scores which are in the same row and followed by the same letter (or no letter) are not significantly different from one another at the 90% confidence level.

TABLE VII

|  | Hamlin | 50% Hamlin 50% Valencia | Valencia | Hamlin Serum | | Valencia Serum | |
| --- | --- | --- | --- | --- | --- | --- | --- |
|  | Juice Control | Valencia Control | Juice Control | 50/50 Solids | Valencia Solids | 50/50 Solids | Hamlin Solids |
| Total Orange | $3.4^c$ | $4.6^a$ | $4.8^a$ | $4.1^{ab}$ | $3.9^{bc}$ | $4.5^a$ | $4.7^a$ |
| Raw Orange | $0.9^c$ | $1.3^{abc}$ | $1.3^{ab}$ | $1.1^{abc}$ | $0.9^{bc}$ | $1.4^a$ | $1.4^a$ |
| Cooked Orange | 0.9 | 1.1 | 0.9 | 1.0 | 0.8 | 0.9 | 0.9 |
| Expressed Orange Oil | $1.1^c$ | $1.8^{ab}$ | $1.8^a$ | $1.6^{ab}$ | $1.4^{bc}$ | $1.6^{ab}$ | $1.6^{ab}$ |

TABLE VII-continued

|  | Hamlin Juice Control | 50% Hamlin 50% Valencia Control | Valencia Juice Control | Hamlin Serum 50/50 Solids | Hamlin Serum Valencia Solids | Valencia Serum 50/50 Solids | Valencia Serum Hamlin Solids |
|---|---|---|---|---|---|---|---|
| Candy/Artificial Orange | 0.6 | 0.4 | 0.7 | 0.5 | 0.8 | 0.6 | 0.8 |
| Other Fruit | 1.1$^a$ | 0.3$^b$ | 0.4$^b$ | 0.4$^b$ | 0.3$^b$ | 0.2$^b$ | 0.2$^b$ |
| Cooked Vegetable | 0.1 | 0.1 | 0.0 | 0.1 | 0.1 | 0.0 | 0.0 |
| Microbiological | 0.1 | 0.0 | 0.0 | 0.1 | 0.0 | 0.0 | 0.0 |
| Sweet | 5.3$^{abc}$ | 5.4$^{abc}$ | 5.5$^a$ | 5.2$^{bc}$ | 5.1$^c$ | 5.4$^{abc}$ | 5.4$^{ab}$ |
| Viscosity | 1.52$^{bc}$ | 1.53$^{abc}$ | 1.56$^a$ | 1.52$^{bc}$ | 1.51$^c$ | 1.54$^{ab}$ | 1.53$^{bc}$ |

These sensory analysis data demonstrate that a 100% Valencia juice and a 100% Hamlin juice have many significantly different aromatic attributes. The 100% Hamlin juice had lower positive attributes and higher negative attributes. Replacing the sinking solids of a 100% Hamlin juice with Valencia sinking solids, either completely or partially (at 50%) resulted in a juice with significantly higher positive attributes and lower negative attributes. This indicates that the substitution of Valencia sinking solids for Hamlin sinking solids in a Hamlin serum blended product converts the inferior Hamlin juice to a juice having a sensory profile close to the superior Valencia juice resources.

The data further indicate that Valencia serum or juice, such as during the Valencia season, is an acceptable outlet for inferior Hamlin sinking solids. The Valencia serum accepted Hamlin sinking solids without seriously impacting juice quality. This result is shown whether all of the Valencia solids or half of the Valencia solids were replaced with Hamlin solids.

EXAMPLE 7

This Example illustrates that the addition of sinking solids from a superior orange juice source into a juice blend enhanced positive and suppressed negative flavor characteristics of the resulting blended orange juice. This Example illustrates that, as the amount of sinking solids in the 50/50 blend of Valencia juice and Hamlin juice increased, the total orange flavor and raw orange flavor positive attributes increased while the negative sensory notes of other citrus and chemical decreased. TROPICANA® PURE PREMIUM® NFC orange juice was modified by adding selected volumes of like-originating soluble solids.

One product had 7% soluble solids added on a volume/volume basis, another had 14% by volume added, and a third had 21% by volume added. The total orange sensory attribute scores were 4.8 for the 7%, 4.9 for the 14%, and 5.0 for the 21% volume samples. According to analysis of variance and Tukey's LSD, the 7% sample and 21% sample were significantly different from each other at alpha=0.10, the p-Value being 0.06. Viscosity scores were as follows: 1.55 for the 7%, 1.57 for the 14%, and 1.59 for the 21%. Here the p-Value was 0.07. Again, the 7% and 12% products were significantly different from each other.

EXAMPLE 8

This Example illustrates other cases where sensory improvement or alteration is attained by adding sinking solids. In one approach juice solids were removed. In another approach, juice solids were added.

The sinking solids removal approach started with whole juice, separated it into serum and sinking solids and added reduced levels of sinking solids to the serum phase. Juice chemistry analysis indicated that the Valencia juice had a sinking solids content of 13 volume percent prior to separation. The stored Hamlin juice had a sinking solids content of 11 volume percent prior to manipulation or blending. An approximately half reduced solids blend having all Valencia serum was analyzed to have a sinking solids quantity of 8 volume percent. A blend of 70/30 freshly extracted Valencia and stored Hamlin with an approximately half reduced Valencia bottom solids was analyzed to have 9 volume percent sinking solids.

An all-Valencia control was pasteurized and passed into 32 oz. glass bottles to provide a control sample having a full level of sinking solids, which was approximately 15 volume percent of the 100% juice. A reduced-solids sample was prepared from the Valencia serum to which was added a mid-level of Valencia sinking solids, at approximately 9 volume percent, based upon the total volume of the juice sample.

Another control was 70% fresh Valencia juice and 30% stored Hamlin juice. This included a full level of Valencia sinking solids (about 15 volume percent). The reduced solids sample product corresponding to this blended control was prepared from the reduced-solids Valencia juice sample product noted above, blended with 30% stored Hamlin juice.

Sensory evaluations of these four Examples indicated that removing up to 6% solids from the Valencia juice stream had no deleterious effects on the sensory properties of the Valencia juice or on the sensory properties of a blend of 70/30 Valencia/Hamlin blended juice. The sensory testing was conducted under red lights in order to mask otherwise noticeable color difference due to solids removal. More specifically, each of the aromatic sensory attributes, basic tastes sensory attributes and feeling factors attributes were not significantly different to the sensory panel for both of the control juices and for both of the reduced-solids juices. There were no significant differences at the 90% confidence level, and the data were analyzed as a factorial design (main effects and interactions).

This Example illustrates, for example, it is possible to exchange sinking solids between Valencia superior juice sources and inferior early/mid juice sources. The result is an improved early/mid juice without noticeably degrading the sensory qualities of the Valencia juice from which solids were removed. Such shows that it is possible to "harvest" Valencia solids, store them, and use them in the early/mid juice season. This shows the superior nature of these Valencia sources compared to these early/mid sources.

In the testing with added sinking solids which was conducted according to this Example, the following samples were pasteurized and filled into 32 oz. glass bottles and subjected to sensory evaluation as discussed herein. The control was a blend of 70 volume percent stored Hamlin and 30 volume percent fresh Valencia, with no additional solids being added. To this blend were added three different levels of Valencia sinking solids. The additions were at 2 volume percent added Valencia solids, 4 volume percent added Valencia solids, and 12 volume percent added Valencia solids. The total sinking solids in the control was 13 volume percent. When each was subjected to chemical analysis, the following determinations were made. The control was analyzed as having 13 volume percent sinking solids. The 2 percent test sample was analyzed to have 15 volume percent sinking solids. The 4% sample was analyzed to have 17 volume percent sinking solids. The 12 percent added sample was found to have 24 volume percent sinking solids.

The sensory testing to evaluate added Valencia solids to the 70/30 blend was conducted under red lights in order to address the noticeable color difference due to solids addition. Sensory results are reported in Table VIII.

TABLE VIII

| | 70% Hamlin 30% Valencia | Added Valencia Solids | | |
|---|---|---|---|---|
| | Control | 2% | 4% | 12% |
| Total Orange | 4.5 | 4.5 | 4.6 | 4.7 |
| Raw Orange | 0.9 | 1.0 | 0.9 | 1.2* |
| Cooked Orange | 1.5 | 1.2* | 1.4 | 1.3* |
| Expressed Orange Oil | 1.5 | 1.7* | 1.8* | 1.7* |
| Viscosity | 1.59 | 1.59 | 1.58 | 1.63* |

In Table VIII, each asterisk indicates a significant difference from the control at the 90% confidence level. These results show that adding as little as 2% Valencia sinking solids to a 70/30 Hamlin/Valencia blend reduced the negative attribute of cooked orange flavor and increased the positive attribute of expressed orange oil flavor. Adding on the order of 12% Valencia solids to this 70/30 blend increased the positive attributes of raw orange flavor, increased perceived viscosity, and reduced the negative attribute cooked orange flavor.

EXAMPLE 9

Freshly extracted Hamlin NFC orange juice which was harvested early in the Hamlin season has characteristic flavor defects characterized as green, woody, sulfur-like, and bitter sensory properties. This Example reports descriptive flavor analyses of early season Hamlin juice, at 0%, about 50% and 100% solids removal. The 100% reduction in bottom solids resulted in a reduction in the negative flavor attribute of bitterness and gave a reduction in viscosity. A reduction of the bottom solids by both about 50% and 100% resulted in reduction of some positive flavor attributes, particularly the raw orange flavor attribute. This flavor reduction would require compensation by blending with other juices or components and/or by other suitable means.

More particularly, the early Hamlin control having all of its natural solids was estimated to have 10 volume percent bottom solids. The viscosity was 5.5 Centipoise, measured as noted in Example 2. The 50% solids sample had an indicated bottom solids of 6 volume percent, while the viscosity was 3.5 Centipoise. The sample from which 100% of the bottom solids were removed was indicated as having no bottom solids, while the viscosity was 2.3 Centipoise.

Each sample was evaluated by a descriptive sensory analysis panel as discussed herein, with sensory results being shown in Table IX. Scores in the same row having the same letter (or no letter) are not significantly different at the 90% confidence level.

TABLE IX

| | Control | 50% Solids | No Solids |
|---|---|---|---|
| Total Orange | 3.6 | 3.3 | 3.2 |
| Raw Orange | 0.8a | 0.6b | 0.6b |
| Bitter | 1.2a | 1.1ab | 1.0b |
| Viscosity | 1.54a | 1.50ab | 1.46b |

EXAMPLE 10

Testing was conducted which indicated that a 70/30 Hamlin/Valencia juice blend had certain negative sensory attributes decline significantly as pulp was removed. There also was a trend for sweetness to increase when pulp was low. Tested were a version having high bottom solids, 16.3 volume percent, medium solids at 4.5 volume percent (which is a 69% reduction) and low bottom solids at 1 volume percent (which is a 94% reduction in bottom solids). In each case, the bottom solids was a mean value.

Each sample was evaluated by a descriptive sensory analysis panel using a 15-point anchored universal line scale. Results of the sensory evaluations are reported in Table X.

TABLE X

| | Control | Med | Low | p-value |
|---|---|---|---|---|
| Total Orange | 4.4a | 4.1b | 3.9b | 0.04 |
| Raw Orange | 1.0 | 1.1 | 0.9 | 0.18 |
| Cooked Orange | 1.1 | 1.0 | 1.0 | 0.23 |
| Expressed Orange Oil | 1.5a | 1.1b | 1.1b | — |
| Candy/Artificial Orange | 0.7 | 0.8 | 1.0 | 0.15 |
| Other Citrus | 0.8a | 0.7a | 0.5b | 0.03 |
| Chemical | 0.9a | 0.8b | 0.7b | 0.10 |
| Other Aromatics | 0.5a | 0.4a | 0.3b | 0.01 |
| Sweet | 5.2 | 5.3 | 5.5 | 0.11 |
| Sour | 3.4a | 3.3a | 3.0b | 0.03 |
| Bitter | 1.2a | 1.1a | 0.7b | 0.01 |
| Feeling Factors | 1.5ab | 1.5a | 1.4b | 0.06 |
| Viscosity | 1.56 | 1.53 | 1.52 | 0.18 |

In each row, the same letter (or no letter) indicates that there is no significant difference at the 90% confident level. These data show that as the amount of bottom solids was reduced, the attributes of total orange, other citrus, chemical, other aromatics, sourness and bitterness, as well as feeling factors declined significantly. Feeling factors refers to chemical interactions of the product with the mouth, for example the astringency of cranberry juice, the bite of citrus oil, the sting of mild carbonation, and the burn of hot peppers. The total orange and bitterness attributes declined the most. There was a trend for sweetness to increase. There was a slight trend for viscosity to decline, but it was not significant.

EXAMPLE 11

In this Example, for a 70/30 Hamlin/Valencia blend, removal of 50 volume percent of the bottom pulp resulted in significantly reduced bitterness. A control of 70/30 volume percent aseptic Hamlin/aseptic Valencia was pasteurized and filled into half-gallon cartons and refrigerated. Another sample was prepared by centrifuging bottom solids out of this control blend so as to remove 50 volume percent of the bottom solids from the control blend. This resulted in significantly reduced bitterness compared to the control, which had a large volume of Hamlin juice that was harvested early in the season. These sensory results are reported in Table XI, where scores in the same row having a different letter are significantly different at alpha=0.10, according to analysis of variance and LSD.

TABLE XI

|  | Control | Bottom Solids Decreased 50% |
|---|---|---|
| Total Orange | 4.6 | 4.3 |
| Raw Orange | 1.4 | 1.3 |
| Expressed Orange Oil | $1.6^a$ | $1.3^b$ |
| Other Citrus | 0.8 | 0.7 |
| Chemical | 0.8 | 0.6 |
| Sweet | 5.0 | 4.9 |
| Sour | 3.1 | 2.8 |
| Bitter | $1.0^{ab}$ | $0.8^c$ |
| Feeling Factors | 1.4 | 1.2 |
| Viscosity | $1.56^{abc}$ | $1.53^{bc}$ |

It will be understood that the embodiments of the present invention which have been described are illustrative of some of the applications of the principles of the present invention. Numerous modifications may be made by those skilled in the art without departing from the true spirit and scope of the invention.

The invention claimed is:

1. A process for preparing not from concentrate (NFC) orange juice from components of differing orange fruit, comprising:
    extracting orange juice from orange fruit during the harvest season for such fruit to provide a whole orange juice;
    separating said whole orange juice into a serum phase and a sinking solids phase;
    storing said sinking solids phase under conditions that retard its deterioration during long term storage; and
    combining said stored solids phase with a recently extracted whole orange juice of a different cultivar than said whole orange juice, whereby the cost of said NFC orange juice is reduced while the overall sensory quality of said recently extracted juice is at least maintained.

2. The process in accordance with claim 1, wherein the whole orange juice which is separated and which provides said stored sinking solids phase has superior sensory properties when compared with the recently extracted whole orange juice, said recently extracted whole orange juice being inferior in sensory properties compared to the whole orange juice which is separated.

3. The process in accordance with claim 2, wherein said superior juice is extracted from Valencia orange fruit and said recently extracted inferior whole orange juice is extracted from early/mid season orange fruit.

4. The process in accordance with claim 3, wherein the early/mid season fruit is Hamlin orange fruit.

5. The process in accordance with claim 1, wherein the whole orange juice which is separated and which provides said stored sinking solids phase has inferior sensory properties when compared with the recently extracted whole orange juice, said recently extracted whole orange juice being superior in sensory properties compared to the whole orange juice which is separated.

6. The process in accordance with claim 5, wherein said inferior juice is extracted from early/mid season orange fruit and said recently extracted superior whole orange juice is extracted from Valencia orange fruit.

7. The process in accordance with claim 1, wherein said combining further includes incorporating a stored orange juice source other than said sinking solids phase.

8. The process in accordance with claim 7, wherein said other stored orange juice source is selected from the group consisting of a stored whole orange juice, a stored serum phase and a stored sinking solids phase different from the sinking solids phase from said extracting, separating and storing procedure.

9. The process in accordance with claim 8, wherein said stored serum phase is of the same type of whole orange juice of said extracting and separating procedure.

10. The process in accordance with claim 7, wherein the stored orange juice source from the combining procedure is a stored Valencia source, and said recently extracted whole orange juice is an early/mid season NFC orange juice.

11. The process in accordance with claim 1, wherein said overall sensory quality is selected from the group consisting of an increase in the positive aromatic attributes of total orange, raw orange or expressed orange oil; an increase in the basic taste sweet attribute; an increase in positive feeling factors; a decrease in aromatic cooked orange, candy/artificial orange, other fruit, cooked vegetable and microbiological attributes; a reduction in sour or bitter basic tastes; and combinations thereof.

12. The process in accordance with claim 1, wherein said combining of said stored sinking solids phase incorporates between about 2 and about 25 volume percent thereof, based upon the total volume of the orange juice product.

13. The process in accordance with claim 1, further including, prior to said combining, removing sinking solids from said recently extracted whole orange juice.

14. The process in accordance with claim 13, wherein between about 2 and about 25 volume percent of said sinking solids of the recently extracted orange juice are combined, based upon the total weight orange juice product.

15. A process for preparing a not from concentrate (NFC) orange juice product, comprising:
    extracting orange juice from orange fruit during the harvest season for such fruit to provide a whole orange juice;
    separating said orange juice into a serum phase and a sinking solids phase;
    storing said serum phase under conditions that retard its deterioration during long term storage;
    providing a recently extracted whole orange juice from a different cultivar than said orange juice and separating same into a serum phase and a sinking solids phase; and
    combining said stored serum phase with said recently extracted sinking solids phase, whereby the cost of preparing said NFC orange juice product is reduced while the overall sensory quality of said stored serum phase is at least maintained.

16. The process in accordance with claim 15, wherein the stored serum phase is from juice having superior properties, and said freshly extracted solids phase is from juice having inferior properties, when said superior and inferior properties are compared with each other.

17. The process in accordance with claim 16, wherein said superior stored serum phase is from Valencia orange fruit, and said inferior freshly extracted sinking solids are from early/mid season fruit.

18. The process in accordance with claim 15, wherein the stored serum phase is from juice having inferior properties, and said freshly extracted solids phase is from juice having superior properties, when said inferior and superior properties are compared with each other.

19. The process in accordance with claim 18, wherein said inferior stored serum phase is from early/mid season orange fruit, and said superior freshly extracted sinking solids are from Valencia fruit.

20. A process for preparing a not from concentrate (NFC) orange juice product, comprising:
   extracting orange juice from orange fruit during the harvest season for such fruit to provide a whole orange juice;
   separating said whole orange juice into a serum phase and a sinking solids phase;
   storing said sinking solids phase under conditions that retard its deterioration during long term storage;
   providing a recently extracted orange juice from a different cultivar;
   separating from said recently extracted orange juice at least some of its sinking solids to provide a reduced-solids freshly extracted orange juice; and
   combining said freshly extracted solids-reduced orange juice with said stored sinking solids phase to thereby prepare the NFC orange juice product.

21. The process in accordance with claim 20, wherein the cost of the components of the combining procedure is lower than the total cost of said unseparated whole orange juice when stored for the same length of time as its stored sinking solids phase, and whereby the overall sensory quality of the NFC orange juice product is at least equivalent to one combining said unseparated whole orange juice with said recently extracted whole orange juice.

22. The process in accordance with claim 20, wherein said stored sinking solids phase was separated from Valencia juice, and said freshly extracted solids-reduced orange juice was prepared from early/mid season orange juice fruit.

23. The process in accordance with claim 20, wherein said whole orange juice separated into said stored sinking solids has superior sensory qualities compared with said freshly extracted orange juice, and wherein up to about 25 volume percent of said stored sinking solids phase is added to the NFC orange juice product, and between about 2 and about 25 volume percent of the sinking solids of said freshly extracted orange juice were removed therefrom, based upon the total volume of the NFC orange juice product.

24. The process in accordance with claim 23, wherein the volume percent of stored sinking solids added is less than the volume percent of sinking solids removed from the freshly extracted juice, based upon the total volume of the NFC orange juice product.

25. The process in accordance with claim 20, wherein one of said whole orange juice which is separated and which provides said stored sinking solids phase and said recently extracted orange juice which provides said reduced-solids freshly extracted orange juice has superior sensory properties when compared with the other, and wherein a volume percent contributed by said one of said stored sinking solids phase and said reduced-solids freshly extracted orange juice having superior sensory properties, based on the total volume percent of said NFC orange juice, is combined in an amount less than a volume percent of said whole orange juice of like superior sensory properties that is required in a whole juice NFC blend having equivalent sensory quality.

26. A not from concentrate (NFC) orange juice product comprising:
   from about 75 to about 98 volume percent of a recently extracted whole juice, based upon the total volume of the juice product;
   from about 2 to about 25 volume percent, based upon the total volume of the juice product, of a sinking solids phase which had been separated from a previously harvested orange juice and stored under conditions that retard deterioration; and
   said sinking solids phase originated from an orange fruit cultivar which is different from the orange fruit cultivar of the recently extracted whole orange juice.

27. The orange juice product in accordance with claim 26, wherein said recently extracted whole juice is early/mid season juice, and said stored sinking solids phase was separated from Valencia orange juice.

28. A not from concentrate (NFC) orange juice product comprising:
   from about 75 to about 98 volume percent of a recently extracted early/mid season orange juice from which about 2 to 100 volume percent of its sinking solids had been removed, based upon the total volume of the juice product; and
   from about 2 to about 25 volume percent, based upon the total volume of the juice product, of a sinking solids phase which had been separated from a previously harvested Valencia orange juice and stored under conditions that retard deterioration.

29. A not from concentrate (NFC) orange juice product comprising:
   from about 10 to about 90 volume percent of a whole juice, based on the total volume of the juice product;
   from about 90 to about 10 volume percent, based upon the total volume of the juice product, of a serum phase separated from an orange juice of a cultivar different from that of said whole juice; and
   at least one of said whole juice or said serum phase were stored from previously extracted orange juice.

30. The product in accordance with claim 29, wherein said serum phase is from Valencia orange juice.

31. The product in accordance with claim 29, wherein one of said whole juice and said orange juice from which said serum phase is separated has superior sensory properties when compared with the other, and wherein a volume percent contributed by said whole juice and said serum phase having superior sensory properties, based on the total volume percent of said NFC orange juice, is added in an amount less than a volume percent of a whole orange juice of like superior sensory properties that is required in a whole juice NFC blend having equivalent sensory quality.

32. A process for preparing not from concentrate orange juice product, comprising:
   extracting orange juice from a first orange fruit during a first harvest season to form a first whole orange juice;
   separating said first whole orange juice into a first serum phase and a first sinking solids phase;
   storing said first serum phase and said first sinking solids phase for at least a period of time that extends beyond the first harvest season under conditions that retard deterioration of said first serum phase and said first sinking solids phase, wherein said stored first serum phase is suitable for combining with a later extracted whole orange juice after storage over a long term;
   providing a recently extracted orange juice from a second orange fruit during a second harvest season;
   separating from said recently extracted orange juice at least some of its sinking solids to provide a reduced-solids freshly extracted orange juice; and
   combining said freshly extracted solids-reduced orange juice with said first stored sinking solids phase to thereby prepare the NFC orange juice product, wherein one of said first whole orange juice which is separated and which provides said first stored sinking solids phase and said recently extracted orange juice which provides said reduced-solids freshly extracted orange juice has superior sensory properties when compared with the other, and wherein a volume percent contributed by said one of said first stored sinking solids phase and said reduced-solids freshly extracted orange juice having superior sensory properties, based on the total volume percent of said NFC orange juice, is combined in an amount less than a volume percent of a whole orange juice of like superior sensory properties that is required in a whole juice NFC blend having equivalent sensory quality.

33. A process for preparing not from concentrate (NFC) orange juice from components of differing orange fruit, comprising:

extracting orange juice from orange fruit during the harvest season for such fruit to provide a whole orange juice;

separating said whole orange juice into a serum phase and a sinking solids phase;

storing said sinking solids phase under conditions that retard its deterioration during long term storage; and combining said stored solids phase with a recently extracted whole orange juice of a different cultivar than said whole orange juice, wherein one of said whole orange juice which is separated and which provides said stored sinking solids phase and said recently extracted whole orange juice has superior sensory properties when compared with the other, and wherein a volume percent contributed by said one of said stored sinking solids phase and said recently extracted whole orange juice having superior sensory properties, based on the total volume percent of said NFC orange juice, is added in an amount less than a volume percent of said whole orange juice of like superior sensory properties that is required in a whole juice NFC blend having equivalent sensory quality.

34. A process for preparing not from concentrate (NFC) orange juice from components of differing orange fruit, comprising:

extracting orange juice from orange fruit during the harvest season for such fruit to provide a whole orange juice;

separating said whole orange juice into a serum phase and a sinking solids phase;

storing said sinking solids phase under conditions that retard its deterioration during long term storage; and combining said stored sinking solids phase and a stored orange juice source other than said sinking solids phase with a recently extracted whole orange juice, wherein at least one of said whole orange juice which is separated and which provides said stored sinking solids phase and said other stored orange juice source and said recently extracted whole orange juice is of a different cultivar and has superior sensory properties when compared with the other, and wherein a combined volume percent contributed by said at least one of said stored sinking solids and said other stored orange juice source and said recently extracted whole orange juice having superior sensory properties, based on the total volume percent of said NFC orange juice, is added in an amount less than a volume percent of said whole orange juice of like superior sensory properties that is required in a whole juice NFC blend having equivalent sensory quality.

35. A process for preparing a not from concentrate (NFC) orange juice product comprising:

extracting orange juice from orange fruit during the harvest season for such fruit to provide a whole orange juice;

separating said orange juice into a serum phase and a sinking solids phase;

storing said serum phase under conditions that retard its deterioration during long term storage;

providing a recently extracted whole orange juice and separating same into a serum phase and a sinking solids phase; and combining said stored serum phase with said recently extracted sinking solids phase, wherein one of said whole orange juice which is separated and which provides said stored serum phase and said recently extracted whole orange juice has superior sensory properties when compared with the other, and wherein a volume percent contributed by said one of said stored sinking solids phase and said recently extracted whole orange juice having superior sensory properties, based on the total volume percent of said NFC orange juice, is added in an amount less than a volume percent of said whole orange juice of like superior sensory properties that is required in a whole juice NFC blend having equivalent sensory quality.

* * * * *